United States Patent
Xu et al.

(10) Patent No.: US 10,285,073 B2
(45) Date of Patent: May 7, 2019

(54) METHOD AND APPARATUS FOR CELL CONFIGURATION

(71) Applicant: Telefonaktiebolaget LM Ericsson (publ), Stockholm (SE)

(72) Inventors: Jiying Xu, Beijing (CN); Yang Tian, Beijing (CN); Min Huang, Beijing (CN); Feng Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2 days.

(21) Appl. No.: 15/578,348

(22) PCT Filed: Jun. 2, 2015

(86) PCT No.: PCT/CN2015/080599
§ 371 (c)(1),
(2) Date: Nov. 30, 2017

(87) PCT Pub. No.: WO2016/192044
PCT Pub. Date: Dec. 8, 2016

(65) Prior Publication Data
US 2018/0167828 A1 Jun. 14, 2018

(51) Int. Cl.
*H04W 16/32* (2009.01)
*H04W 16/30* (2009.01)
(Continued)

(52) U.S. Cl.
CPC ............ *H04W 16/32* (2013.01); *H04W 4/33* (2018.02); *H04W 16/30* (2013.01);
(Continued)

(58) Field of Classification Search
CPC .. H04W 16/14; H04W 16/32; H04W 36/0083
See application file for complete search history.

(56) References Cited

U.S. PATENT DOCUMENTS

| 5,021,801 A | * | 6/1991 | Smith | ................. | H01Q 3/247 |
| | | | | | 343/876 |
| 7,729,269 B1 | * | 6/2010 | Nucci | ................. | H04L 43/0882 |
| | | | | | 370/238 |

(Continued)

FOREIGN PATENT DOCUMENTS

| CN | 102111812 A | 6/2011 | |
| CN | 103650564 A | 3/2014 | |
| WO | WO2015000178 | * 8/2015 ............ H04W 16/14 |

OTHER PUBLICATIONS

PCT International Search Report for International application No. PCT/CN2015/080599—dated Mar. 7, 2016.

(Continued)

*Primary Examiner* — Myron Wyche
(74) *Attorney, Agent, or Firm* — Patent Portfolio Builders, PLLC

(57) ABSTRACT

Embodiments of the present disclosure provide a cell configuration method in a wireless network with a plurality of carriers. The method is performed at a base station of the wireless network. The method comprises generating a common cell from a first plurality of sectors at a first carrier of the plurality of carriers and identifying one or more high-traffic sectors from a second plurality of sectors at a second carrier of the plurality of carriers by monitoring a traffic volume of each of the second plurality of sectors. Each of the identified high-traffic sectors has the traffic volume higher than a predetermined threshold. The method also comprises generating one or more independent high-traffic cells from the one or more high-traffic sectors. The first plurality of sectors at least partially overlaps with the second plurality of sectors. Correspondingly, there is also provided an apparatus for cell configuration in a wireless network with a plurality of carriers.

17 Claims, 9 Drawing Sheets

(51) Int. Cl.
　　　*H04W 36/22*　　(2009.01)
　　　*H04W 4/33*　　　(2018.01)
　　　*H04W 28/02*　　(2009.01)
　　　*H04W 36/32*　　(2009.01)
　　　*H04W 16/14*　　(2009.01)
(52) U.S. Cl.
　　　CPC ... *H04W 28/0226* (2013.01); *H04W 28/0247* (2013.01); *H04W 36/22* (2013.01); *H04W 36/32* (2013.01); *H04W 16/14* (2013.01)

(56) References Cited

U.S. PATENT DOCUMENTS

| | | | | |
|---|---|---|---|---|
| 8,107,961 | B1* | 1/2012 | Vargantwar | H04W 36/0083 370/331 |
| 2014/0162642 | A1 | 6/2014 | Kwon et al. | |
| 2015/0016282 | A1* | 1/2015 | Su | H04W 36/0088 370/252 |

OTHER PUBLICATIONS

PCT Written Opinion of the International Searching Authority for International application No. PCT/CN2015/080599—dated Mar. 7, 2016

3GPP TR 36.823 v11.0.1; Technical Report; 3rd Generation Partnership Project; Technical Specification Group Radio Access Network; Evolved Universal Terrestrial Radio Access (E-UTRA); Carrier aggregation enhancements; User Equipment (UE) and Base Station (BS) radio transmission and reception (Release 11)—Sep. 2013.

\* cited by examiner

METHOD AND APPARATUS FOR CELL CONFIGURATION

PRIORITY

This nonprovisional application is a U.S. National Stage Filing under 35 U.S.C. § 371 of International Patent Application Serial No. PCT/CN2015/080599 filed Jun. 2, 2015, and entitled "Method And Apparatus For Cell Configuration."

TECHNICAL FIELD

The non-limiting and exemplary embodiments of the present disclosure generally relate to wireless communications, and specifically to a method and an apparatus for cell configuration in a wireless network with a plurality of carriers.

BACKGROUND

This section introduces aspects that may facilitate better understanding of the present disclosure. Accordingly, the statements of this section are to be read in this light and are not to be understood as admissions about what is in the prior art or what is not in the prior art.

In the indoor cellular network construction, fine network dimensioning is highly costly or even impossible due to a limited construction budget and a complicated radio propagation environment. Usually, an area is covered by a number of sectors, each of which may be radiated by a decentralized antenna. These antennas may transmit identical or different radio signals. Without fine network dimensioning, these sectors may overlap irregularly on their boundaries. Thus, the Signal to Interference plus Noise Ratio (SINR) at boundary areas may be low when the antennas radiating these sectors transmit different signals at the same carrier frequency.

In order to guarantee a high SINR at the boundary areas, a technique called as combined-cell may be adopted. The basic idea of the combined-cell is to combine those sectors having an identical carrier frequency, an identical bandwidth and a partially overlapping coverage, to generate a common cell. The common cell covers the whole area under coverage of those sectors and is radiated by all of the antennas that radiate the sectors. In this common cell, any piece of time-frequency resource can only be allocated to one user equipment (UE); and all sectors provide the same Cell-specific Reference Signal (CRS) and Synchronization Signal, and the same public control channels. In Long Term Evolution (LTE) systems, the public control channels comprise Physical Broadcast Channel (PBCH), Physical Control Format Indicator Channel (PCFICH), Physical Hybrid-ARQ Indicator Channel (PHICH) and Physical Downlink Control Channel (PDCCH) in downlink and Physical Uplink Control Channel (PUCCH) and Physical Random Access Channel (PRACH) in uplink, whose characters, together with the CRS, are determined by a Physical Cell Identifier (PCI). In the common cell, all the sectors use the same cell ID.

FIG. 1 shows an example of a combined-cell system, in which a total of six sectors, which originally correspond to six independent non-combined cells with the same carrier frequency, are combined to form a common cell. Each sector is equipped with a separate antenna, and all antennas are connected to a common digital unit (DU) of a base station. All signal processing and protocol processing in both downlink and uplink is collectively executed at the DU, which makes it possible to jointly allocate resources and perform scheduling for the whole common cell.

A main benefit brought by the combined-cell is performance enhancement at the boundary areas, in which downlink signals from adjacent sectors strongly override. Since any piece of time-frequency resource can only be allocated to one UE, the sectors in the common cell may transmit identical downlink data channels to or receive uplink data channels from a UE simultaneously on the time-frequency resource allocated to that UE. In this way, the signals from the respective sectors are reinforced instead of interrupted with each other, and hence the downlink or uplink data transfer performance at the boundary areas are greatly improved.

Another benefit brought by the combined-cell is elimination of the UE handover when it is roaming among these sectors of the common cell.

However, these benefits are at the cost of reduced overall spectrum efficiency and system throughput, since one piece of time-frequency resource can only be used by only one UE, regardless of the location of this UE within the sectors constituting the common cell. Compared with the independent resource allocation at all the sectors without the cell combination, only a fraction of the spectrum efficiency is obtained.

An idea of spatial domain multiplexing (SDM) was proposed to compensate for the loss of the combined-cell. The SDM selects a group of UEs that are spatially isolated, and then allocates a same piece of time-frequency resource to them for data transfer simultaneously. This manner can enable multiplexing of resources of Physical Downlink Shared Channel (PDSCH) and Physical Uplink Shared Channel (PUSCH). However, it needs the multiplexed UEs to be scheduled jointly. This requires schedulers of multiple sectors to be coupled, which may greatly increase the implementation complexity and processing delay. Besides, the SDM has deteriorated performance for Release-8 UEs, because it cannot guarantee that the sectors whose CRSs are used in channel estimation and frequency offset estimation are just those who transfer downlink data to the UEs.

Furthermore, with the development of the radio communications technology, multiple carrier frequencies may be granted for a wireless network, in which signals may be transferred in the same sector but on different carriers. By combining the sectors at each carrier, multiple combined-cells may have the same or similar coverage areas on different carriers. Each carrier may run as an independent cell.

However, except for the general idea of cell combination and the SDM as introduced above, the combined-cell system with multiple carriers has not been optimized, e.g. for a balance between coverage and spectrum efficiency or capacity.

SUMMARY

Various embodiments of the present disclosure mainly aim at providing a cell configuration method for a wireless network with multiple carriers, which may leverage the advantages of combined cells and non-combined cells according to traffic geographical distributions, so as to achieve both ubiquitous basic coverage and spectrum efficiency boost.

Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method for cell configuration. The method is performed at a base station of a wireless network with a plurality of carriers, including a first carrier and second carrier. The method comprises generating a common cell from a first plurality of sectors at the first carrier and identifying one or more high-traffic sectors from a second plurality of sectors at the second carrier. The identifying is implemented by monitoring a traffic volume of each of the second plurality of sectors. Each of the identified high-traffic sectors has the traffic volume higher than a predetermined threshold. The method also comprises generating one or more independent high-traffic cells from the one or more high-traffic sector. Furthermore, the first plurality of sectors at least partially overlaps with the second plurality of sectors. In some embodiments, the wireless network may be a distributed antenna network.

By means of this cell configuration, a common cell covering the whole area is provided at one carrier that enables terminal devices to move freely within the common cell without a need for frequent handover and also guarantees a high SINR for the terminal devices connected thereto. Meanwhile, one or more independent high-traffic cells are provided at another carrier so that time-frequency resources of the wireless network could be multiplexed within the generated cells and hence the spectrum efficiency and the system capacity may be increased. Furthermore, since these cells are independent, their schedulers are decoupled, and thus low processing complexity and a short processing delay may be achieved.

In an embodiment, two or more high-traffic sectors that are at least partially overlapping may be merged into one high-traffic cell. In this way, the inter-sector interference is eliminated among these sectors, and the handover frequency of a terminal device connected to the high-traffic cell may be further reduced when it moves among the high-traffic sectors.

In yet another embodiment, the one or more high-traffic sectors may be adjusted according to a change in the monitored traffic volume. In this embodiment, one or more independent high-traffic cells may be generated from the adjusted one or more high-traffic sectors. In this way, the cell configuration may be dynamically adjusted in accordance with the movement of terminal devices and/or the variance of their traffic data rates.

In yet another embodiment, the base station may support carrier aggregation. In such an embodiment, the method may further comprise configuring the common cell as a primary cell for a terminal device with the carrier aggregation and configuring the high-traffic cell where the terminal device is located as a secondary cell for the terminal device. In this way, the inter-frequency handover may be eliminated for a network with carrier aggregation.

In yet another embodiment, a terminal device may be connected to the common cell or to a high-traffic cell of the one or more high-traffic cells based partially on a traffic volume of the terminal device.

In a further embodiment, the terminal device may be connected to the common cell or to the high-traffic cell based further on a position of the terminal device.

In a second aspect of the present disclosure, there is provided an apparatus for cell configuration. The apparatus may be embodied at or as at least part of a base station of a wireless network with a plurality of carriers. The apparatus comprises a generating unit and an identifying unit. The generating unit is configured to generate a common cell from a first plurality of sectors at a first carrier of the plurality of carriers. The identifying unit is configured to identify one or more high-traffic sectors from a second plurality of sectors at a second carrier of the plurality of carriers by monitoring a traffic volume of each of the second plurality of sectors. Each of the identified high-traffic sector has the traffic volume higher than a predetermined threshold. The generating unit is further configured to generate one or more independent high-traffic cells from the one or more high-traffic sectors. The first plurality of sectors at least partially overlaps with the second plurality of sectors.

In an embodiment, the generating unit may be further configured to merge two or more high-traffic sectors that are at least partially overlapping into one high-traffic cell.

In another embodiment, the identifying unit may be further configured to adjust the one or more high-traffic sectors according to a change in the monitored traffic volume. In this embodiment, the generating unit may be further configured to generate one or more independent high-traffic cells from the adjusted one or more high-traffic sectors.

In yet another embodiment, the wireless network may support carrier aggregation. In such an embodiment, the apparatus may further comprise a configuring unit. The configuring unit may be configured to configure the common cell as a primary cell for a terminal device with the carrier aggregation and to configure the high-traffic cell where the terminal device is located as a secondary cell for the terminal device.

In yet another embodiment, the apparatus may further comprise a connecting unit. The connecting unit may be configured to cause a terminal device to be connected to the common cell or to a high-traffic cell of the one or more high-traffic cells based partially on a traffic volume of the terminal device.

In a further embodiment, the connecting unit may be configured to cause the terminal device to be connected to the common cell or to the high-traffic cell based further on a position of the terminal device.

In a third aspect of the present disclosure, there is provided an apparatus for cell configuration. The apparatus may be embodied at or as at least part of a base station of a wireless network with a plurality of carriers. The apparatus comprises a processor and a memory. The memory contains instructions executable by the processor, whereby the apparatus is operative to perform the method according to the first aspect of the present disclosure.

In a fourth aspect of the present disclosure, there is provided an apparatus for cell configuration. The apparatus may be embodied at or as at least part of a base station of a wireless network with a plurality of carriers. The apparatus comprises processing means that is adapted to perform the method according to the first aspect of the present disclosure.

In a fourth aspect of the present disclosure, there is provided a computer program. The computer program comprises instructions which, when executed on at least one processor, cause the at least one processor to carry out the method according to the first aspect of the present disclosure.

BRIEF DESCRIPTION OF THE DRAWINGS

The above and other aspects, features, and benefits of various embodiments of the present disclosure will become more apparent from the following detailed description with reference to the accompanying drawings, in which.

Like reference numbers and designations in the various drawings indicate like elements.

DETAILED DESCRIPTION

Figure 1:
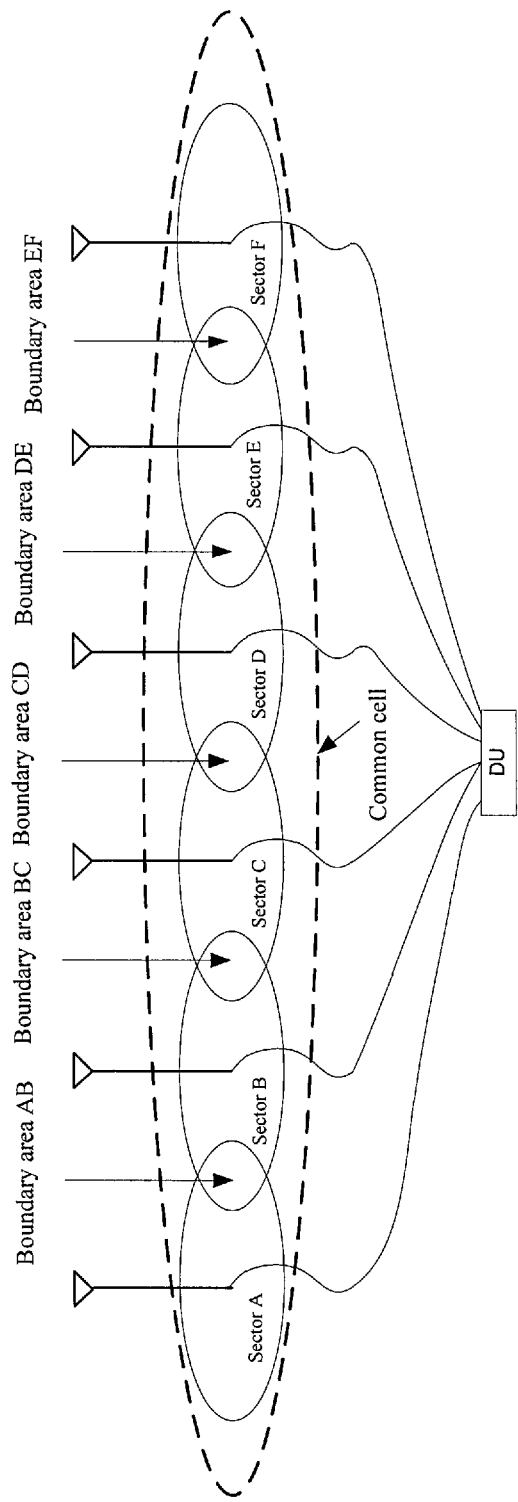
FIG. 1 shows an example of a combined-cell system.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such a feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station", used herein may also be referred to as e.g. eNB, eNodeB, NodeB or base transceiver station (BTS), Access Node (AN) or Access Point (AP) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. In this document, the terms "base station" and "eNB" may be used interchangeably, while the terms "terminal device" and "UE" may be used interchangeably. The term "sector" used hereafter refers to coverage of one or more antennas of a radio unit of a base station. The base station may comprise a DU and a plurality of radio units (RUs). The DU performs all signal processing and protocol processing in both downlink and uplink for all of the RUs.

Figure 2:
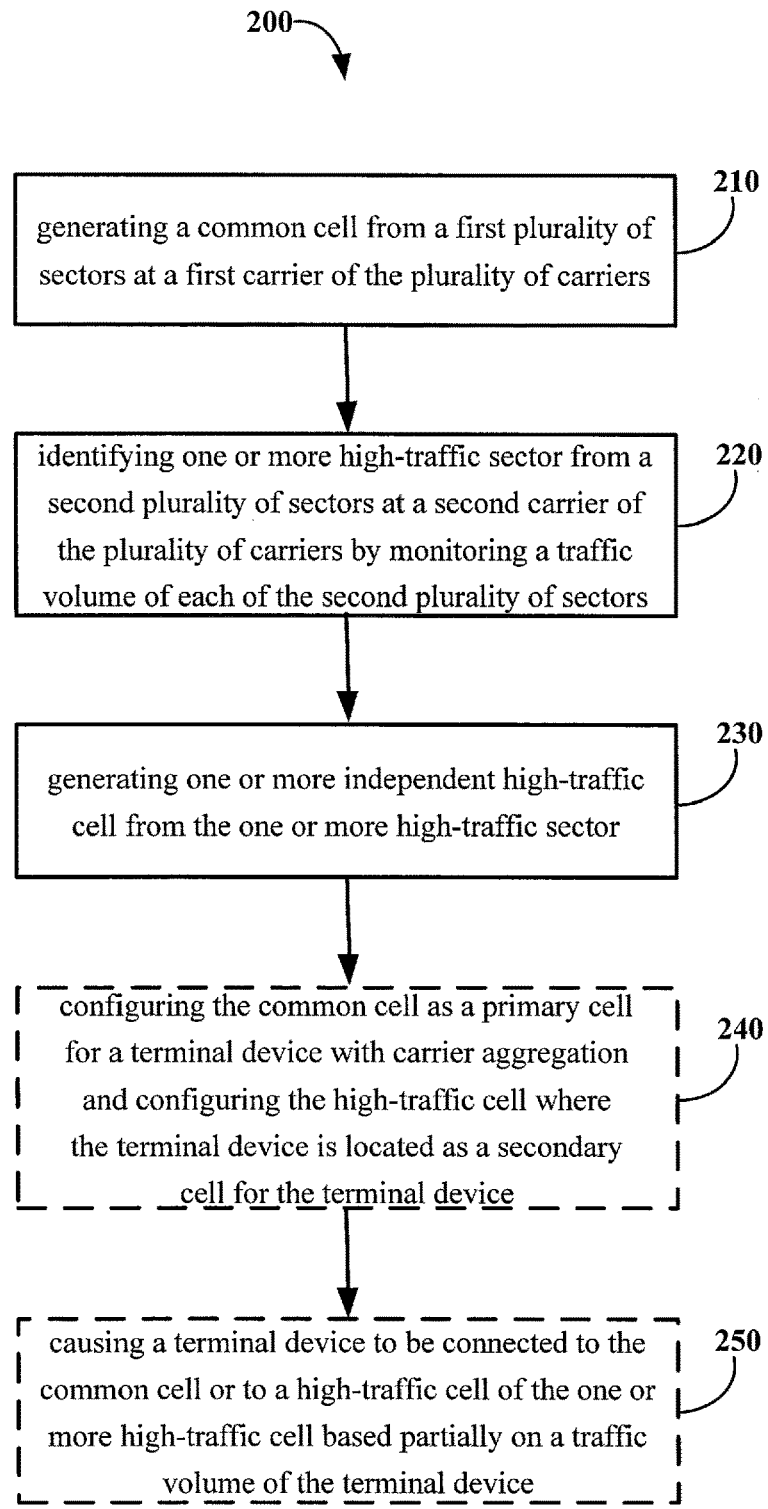
FIG. 2 illustrates a flowchart of a method for cell configuration according to an embodiment of the present disclosure.

FIG. 2 illustrates a flowchart of a method 200 for cell configuration according to an embodiment of the present disclosure. The method 200 is performed at a base station of a wireless network with a plurality of carriers. The wireless network is covered at least by a first plurality of sectors at a first carrier of the plurality of carriers and a second plurality of sectors at a second carrier of the plurality of carriers. The first plurality of sectors at least partially overlaps with the second plurality of sectors.

The method enters at block 210, in which a common cell is generated from the first plurality of sectors at the first carrier for providing global coverage. Within this common cell, any piece of time-frequency resource on the first carrier is only allocated to one terminal device so that there is no inter-sector interference with that terminal device. Furthermore, a terminal device may freely move among the first plurality of sectors of the common cell without a need for handover.

In block 220, one or more high-traffic sectors are identified from a second plurality of sectors at a second carrier of the plurality of carriers by monitoring a traffic volume of each of the second plurality of sectors. Each of the identified high-traffic sectors has the traffic volume higher than a first predetermined threshold.

The traffic volume of a sector may be defined as a total amount of traffic for a certain time period. It may be an absolute value, e.g. 100M bytes per second or a relative value, e.g. 20% of the capacity limit of that sector. Correspondingly, the first predetermined threshold may also be an absolute value or a relative value. The traffic volume of a sector may be obtained by aggregating a total amount of the transmitted traffic, including downlink traffic, uplink traffic or both downlink and uplink traffic, of all terminal devices located in the coverage of this sector.

When a terminal device is connected to a wireless network, particularly to a base station of the wireless network, its downlink and uplink traffic amounts can be known by the base station, from either reports of the terminal device or an indication of the core network. Additionally or alternatively, the base station may measure the received uplink signal strength at a sector antenna when the terminal device is transmitting the uplink signal for either necessary control information or service data or transmitting a sounding signal. According to the measured signal strength, it is known by the base station that which sector or sectors the terminal device is located in. Then, the base station may sum up the traffic amounts within a certain time period of all terminal devices located in a same sector to obtain the traffic volume of that sector. If the traffic volume of the sector is higher than the first predetermined threshold, then that sector is identified as a high-traffic sector.

Then in block 230, one or more independent high-traffic cells are generated at the second carrier from the one or more high-traffic sectors.

Normally, the overlapping relationship between sectors is known by the network at the initial network deployment and could be updated in real-time. Therefore, if two or more overlapped sectors are all identified as high-traffic sectors, then these two or more sectors may be merged together to generate one high-traffic cell. Otherwise, if an individual sector is identified as a high-traffic sector and doesn't overlap with any other high-traffic sector, then this sector may be generated as a standalone high-traffic cell. Each of the generated high-traffic cells is an independent cell and is assigned with a unique cell ID.

By this cell configuration, time-frequency resources of the wireless network could be multiplexed within these cells and hence the spectrum efficiency and the system capacity may be increased. Furthermore, the more high-traffic cells are generated, the higher spectrum efficiency and the system capacity could be achieved. In addition, since these cells are independent, their schedulers are decoupled, and thus low processing complexity and a short processing delay may be achieved.

With the movement of terminal devices within the wireless network, the traffic volume of a sector may be changed over time. Therefore, the high-traffic sectors may vary over time. In such a case, the operation of identifying one or more high-traffic sectors may comprise adjusting the one or more high-traffic sectors according to a change in the monitored traffic volume. Then, one or more independent high-traffic cells may be generated from the adjusted one or more high-traffic sectors. Additionally, in order to prevent frequent adjusting, a hysteresis value may be applied to the first predetermined threshold or timing filtering may be taken into account. For example, the monitored traffic volume of a sector may be a time average of the traffic volume of that sector.

Then, in such a wireless network with the common cell and one or more independent high-traffic cells being configured, a terminal device may be connected to the common cell or to a high-traffic cell based on a traffic volume and/or a position of the terminal device in block 250.

Generally speaking, it is preferably to connect a terminal device having a low traffic volume, i.e. lower than a second predetermined volume, to the common cell at the first carrier. The second predetermined volume may be set lower than the first predetermined volume. If a terminal device is not under coverage of any high-traffic cell, it may be connected to the common cell regardless of its traffic volume. This may avoid frequent handover when the terminal device moves within the whole area covered by the common cell and thus reduce the risk of connection drop. As for a terminal device having a high traffic volume, i.e. higher than the second predetermined threshold and located in a high traffic cell, it is preferably to connect that terminal device to the high traffic cell. This may help improving the spectrum efficiency and the system throughput.

Particularly, in an embodiment that the wireless network doesn't support carrier aggregation, when the traffic volume of a terminal device currently connecting to the common cell at the first carrier increases over the second predetermined volume and meanwhile it moves inward to a high-traffic cell at the second carrier, which may be detected by the base station through measuring the received uplink signal strength, that terminal device may be handed over from the common cell to the high-traffic cell. On the opposite, if a terminal device currently connecting to the common cell but its traffic volume decreases below the second predetermined threshold or it moves outward from the high-traffic cell at the second carrier, that terminal device may be handed over to the common cell at the first carrier.

If the technique of carrier aggregation as specified in the LTE-Advanced Release-10 and onward standards is supported, the combined cell and the generated high-traffic cells on different carriers may turn out to be a Primary Cell (PCell) and Secondary Cells (SCells) for a terminal device. In an embodiment that the wireless network supports carrier aggregation, the common cell at the first carrier may be configured as a PCell for a terminal device with the carrier aggregation and the high-traffic cell where the terminal device is located may be configured as a SCell for that terminal device in block 240. In this embodiment, when the terminal device is currently connecting to the common cell, i.e. PCell and its traffic volume increases over the second predetermined volume, the high-traffic cell where the terminal device is located may be activated as the SCell for that terminal device. On the opposite, when the terminal device is currently connecting to the high-traffic cell, i.e. SCell and its traffic volume decreases below the second predetermined volume or it moves outward from the high-traffic cell, the high-traffic cell as the SCell may be deactivated. By this way, the terminal device has no need for handover with its movement or change in the traffic volume.

When the traffic volume of a sector is changed, for example due to a terminal device moving out of or into the sector, the cell configuration at this sector may also be reconfigured. In order to prevent connection drop of the terminal device during the cell reconfiguration, some actions may be taken. For example, when a high-traffic cell is generated at a sector, no terminal device is allowed to connect to this high-traffic cell until all setup procedures are ready. For another example, when a high-traffic cell is deleted from a sector due to the traffic volume of this sector becoming low, all terminal devices connected to this obsolete cell may be handed over to the common cell or to other high-traffic cells accordingly. However, these actions are implementation related and thus will not be detailed in this document.

Those skilled in the art shall appreciate that although the method 200 is described in a specific order as shown in FIG. 2, some operations, for example the operations in blocks 210 and 220, may also be performed in a reverse order or in parallel without departing from the scope of the present disclosure.

The method 200 described above is especially applicable to a distributed antenna system, for example a Radio Dot System (RDS) as proposed by Ericsson. In the following, the method 200 according to embodiments of the present disclosure will be explained in details with respect to four typical antenna deployments as illustrated in FIGS. 3-7.

In order to simplify the illustration without any intention to limit the scope of the present disclosure, the first plurality of sectors at the first carrier as described with reference to FIG. 2 is shown as fully overlapping with the second plurality of sectors at the second carrier in FIGS. 3-7. The number of the first or second plurality of sectors and the numbers of carriers and UEs as illustrated in FIGS. 3-7 are for an illustrative purpose only without limiting the scope of the present disclosure in any way. Furthermore, the ellipses (or circles) drawn with a solid line or a dotted line in FIGS. 3-7 just schematically illustrate the sectors or cells and their relative positional relation rather than showing actual areas covered by these sectors or cells.

Figure 3:
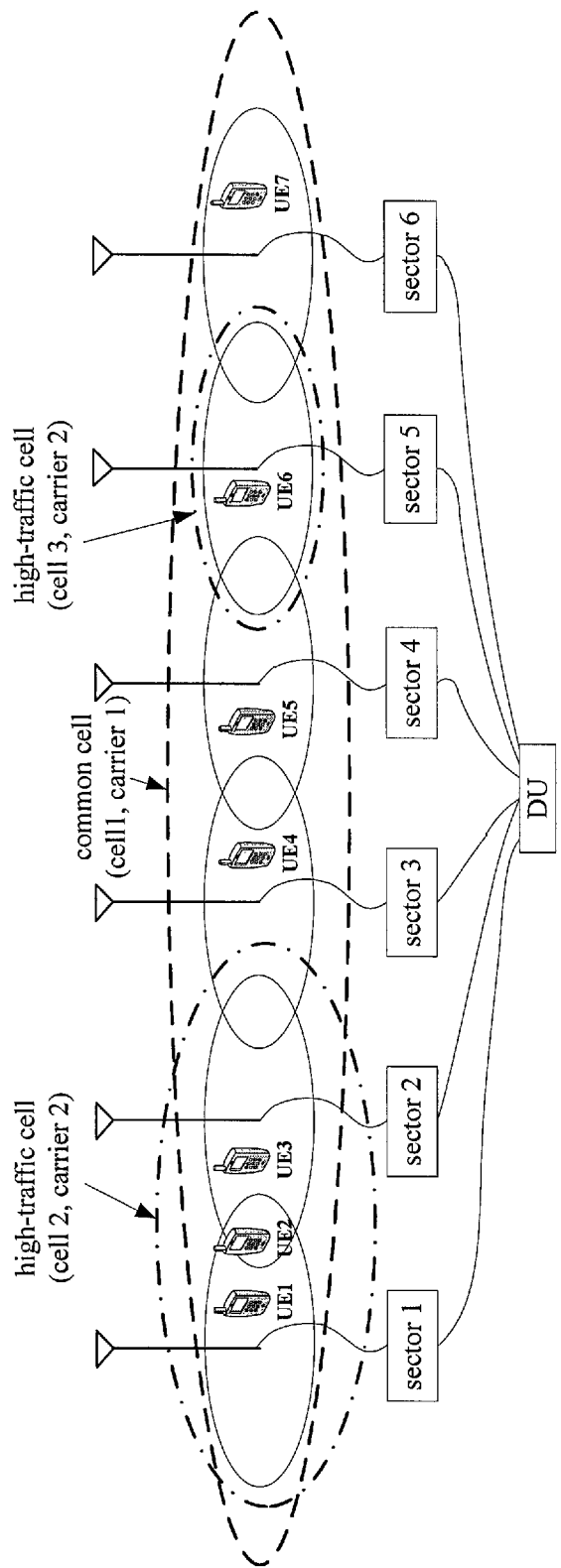
FIG. 3 illustrates an example of the method of FIG. 2 when applied to a distributed antenna network in which sector antennas are deployed in a line.

FIG. 3 illustrates an example of the method 200 when applied to a distributed antenna network in which sector antennas are deployed in a line. For example, a practical application scenario comprises sector antennas equipped in a line of street lamps.

As illustrated in FIG. 3, six sectors radiated by six antennas are deployed in a line and all of them are connected to a common DU of the base station. All signal processing and protocol processing in both downlink and uplink are collectively executed at the DU, which makes it possible to jointly allocate resources and perform scheduling within the whole coverage area.

According to the method 200, the cell configuration may be executed as follows.

At the first carrier, i.e. carrier 1, all six sectors are combined to generate a common cell, i.e. cell 1, which forms global coverage, as illustrated in FIG. 3.

By monitoring the traffic volume of each sector, sectors 1, 2, and 5 are identified as high-traffic sectors. This monitoring may be implemented by monitoring the traffic volume and location of each terminal device connected to that sector. For example, by monitoring the traffic volume and location of each of UEs, UE 1-UE 7 in FIG. 3, it can be known by the base station that UE 1 and UE 2 are located in the same sector 1 and the aggregated traffic volume of UE 1 and UE 2 is higher than a first predetermined threshold. Accordingly, sector 1 is identified as a high-traffic sector. Likewise, UE 2 and UE 3 are located in the same sector 2 and the aggregated traffic volume of UE 2 and UE 3 is also higher than the first predetermined threshold. Thus, sector 2 is also identified as a high-traffic sector. UE 6 is located in sector 5 and its traffic volume is higher than the first predetermined threshold. Thus, sector 5 is also identified as a high-traffic sector.

At this point, two high-traffic cells at the second carrier, carrier 2, can be generated from the three high-traffic sectors, wherein one high-traffic cell 2 is generated by merging sectors 1 and 2 that are partially overlapping together and the other high-traffic cell 3 is generated from the sector 5 as a standalone cell. The high-traffic cells 2 and 3 are independent from each other and are assigned with different cell IDs.

With the above cell configuration, UE 1, UE 2 and UE 3 located in the high-traffic cell 2 may be connected to either the common cell 1 or the high-traffic cell 2 and preferably connected to the high-traffic cell 2 if the corresponding UE has a high traffic volume, i.e. its traffic volume is higher than a second predetermined threshold (such a UE will be referred to as a high-traffic UE). The second predetermined threshold may be set lower than the first predetermined threshold. Likewise, the traffic volume of UE 6 located in the high-traffic cell 3 also has a high traffic volume and thus is preferably connected to the high-traffic cell 3. Other UEs, UE 4, UE 5 and UE 7 have a traffic volume lower than the second predetermined threshold and thus are preferably connected to the common cell 1 to avoid frequent handover when they move among sectors 1-6.

Figure 4:
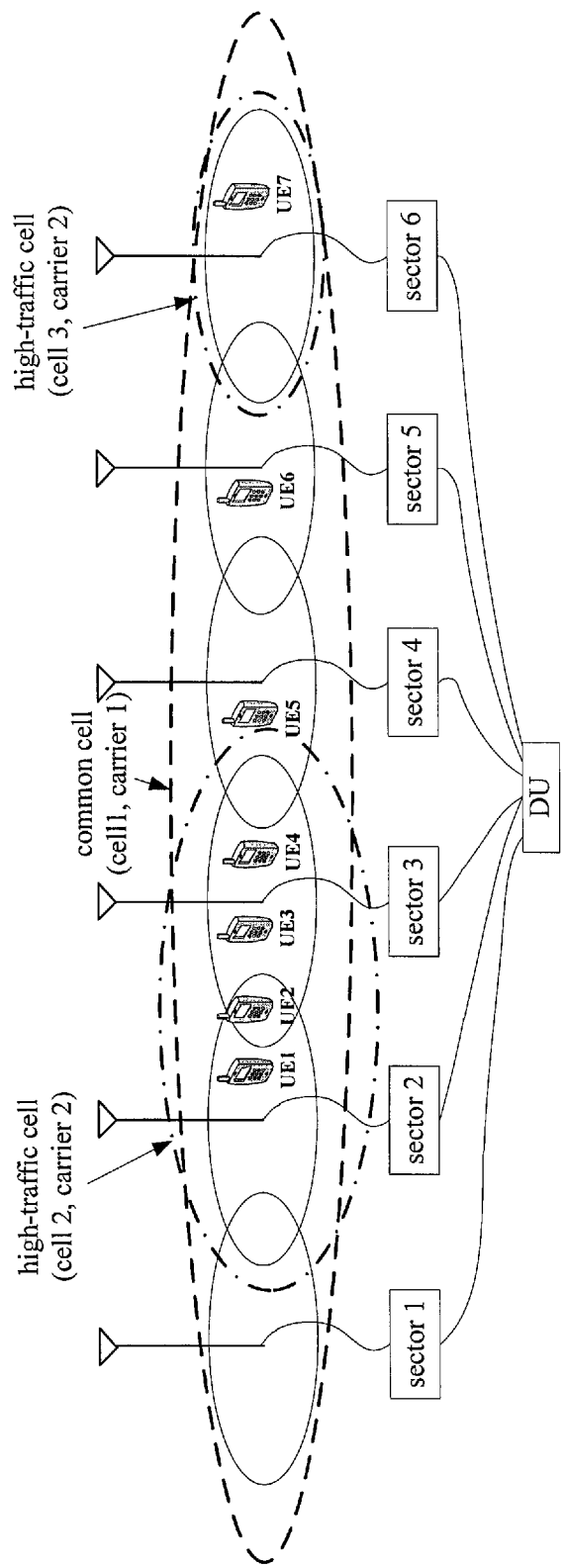
FIG. 4 illustrates an example of adjusting the cell configuration of FIG. 3 according to a change in the monitored traffic volume.

When locations or traffic volumes of the UEs are changed, the monitored sector traffic volumes may also be changed. Thus, the cell configuration may need to be adjusted. FIG. 4 illustrates an example of adjusting the cell configuration of FIG. 3 according to a change in the monitored traffic volume.

By monitoring locations and traffic volumes of UEs, it can be known that the identified high-traffic UE 1 in FIG. 3 moves to sector 2 and the identified high-traffic UEs 2 and 3 in FIG. 3 move into sector 3, as illustrated in FIG. 4. Meanwhile, the traffic volume of UE 6 is decreased below the first predetermined threshold while the traffic volume of UE 7 is increased above the first predetermined threshold.

In this case, two partially overlapping sectors 2 and 3 are identified as high-traffic sectors and thus are merged together to generate a new high-traffic cell 2 at carrier 2. With the decreasing of the traffic volume of UE 6, the traffic volume of sector 5 is also decreased below the first predetermined threshold and thus is excluded from the high-traffic sectors. Oppositely, with the increasing of the traffic volume of UE 7 over the first predetermined threshold, the traffic volume of sector 6 is also increased and thus is identified as a new high-traffic sector. Accordingly, a new high-traffic cell 3 at carrier 2 may be generated from the new high-traffic sector 6, while the old high-traffic cell 3 at sector 6 is cancelled.

After the adjustment of the cell configuration, UE 1, UE 2 and UE 3 may maintain their original connection to the common cell 1 or to the high-traffic cell 2, while the high-traffic UE 7 is preferably handed over from the common cell 1 at carrier 1 to the new high-traffic cell 3 at carrier 2. As for the low-traffic UE 4, although it is located in the high-traffic cell 2, it is preferably connected to the common cell 1 as long as the common cell 1 is not heavily loaded so as to facilitate its mobility. Another low-traffic UE 5 may maintain its connection to the common cell 1, while low-traffic UE 6 will be handed over from the old high-traffic cell 3 at carrier 2 to the common cell 1 at carrier 1.

Further, in the above two examples as illustrated in FIGS. 3 and 4, if the wireless network supports carrier aggregation, the common cell 1 at the first carrier, carrier 1, may be configured as a PCell for a UE with the carrier aggregation, and the high-traffic cell 2 and/or cell 3, where the UE is located, may be configured as a SCell for that UE. In this way, ubiquitous coverage may be provided by the PCell for the UE, while a high traffic transfer capability may be provided by the SCell. The adjustment of the cell configuration will not cause UE's handover between the common cell at the first carrier and high-traffic cells at the second carrier.

Figure 5:
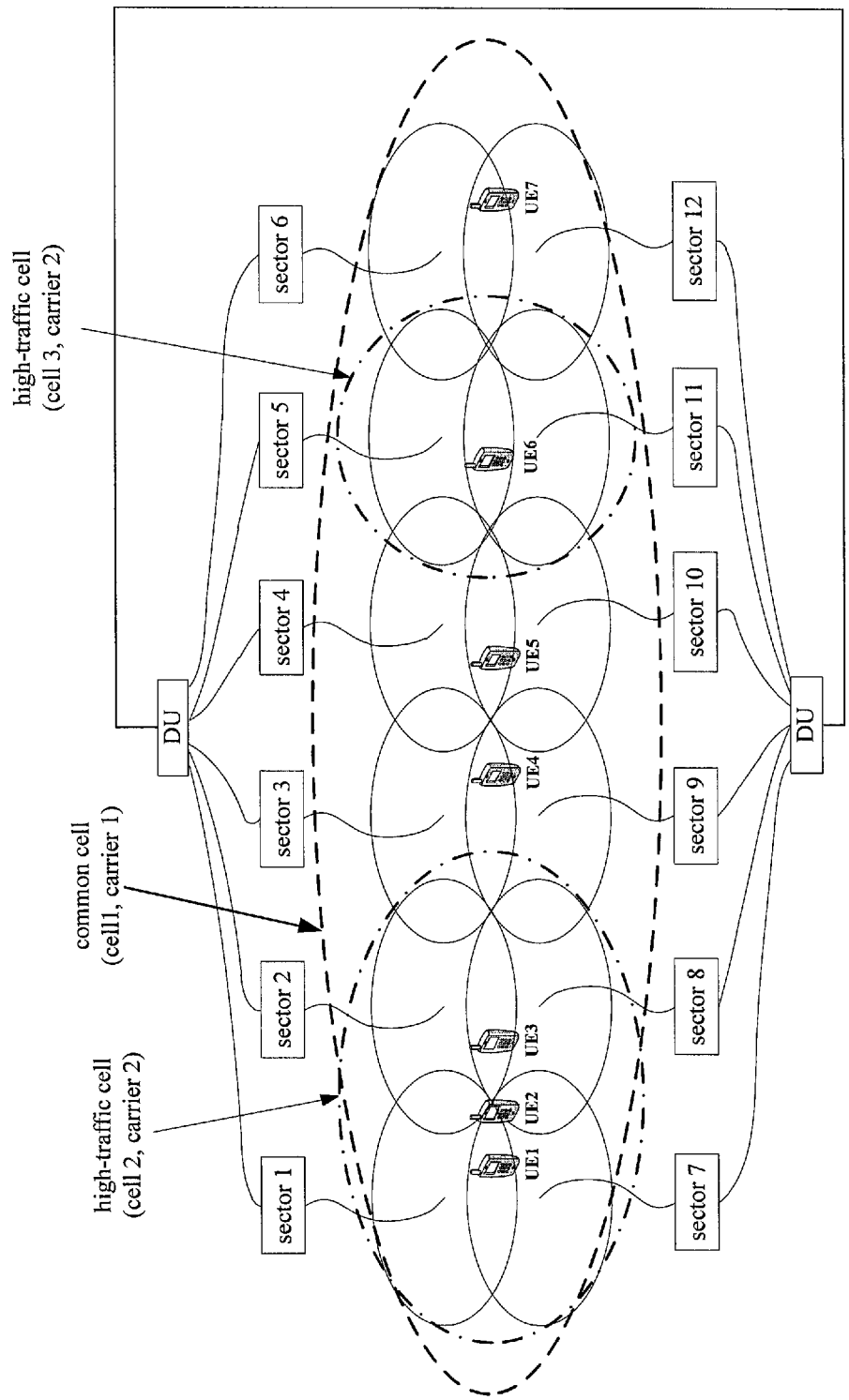
FIG. 5 illustrates another example of the method of FIG. 2 when applied to a distributed antenna network in which sector antennas are deployed in a plane.

FIG. 5 illustrates another example of the method 200 when applied to a distributed antenna network in which sector antennas are deployed in a plane. For example, a practical application scenario comprises sector antennas equipped in the ceiling of a building floor.

In order to simplify the illustration, the antenna located at the center of each sector is omitted. As illustrated in FIG. 5, twelve sectors are deployed in a plane and all of them are connected to a common DU of the base station. As mentioned above, all signal processing and protocol processing in both downlink and uplink are collectively executed at the DU, which makes it possible to jointly allocate resources and perform scheduling within the whole coverage area.

In this example, the cell configuration according to the method 200 may be executed similarly as described with reference to FIG. 3. Therefore, the same parts are omitted from the following description for the sake of brevity.

In this example as illustrated in FIG. 5, at the first carrier, carrier 1, all twelve sectors are combined to generate a common cell, cell 1, which forms global coverage.

By monitoring the traffic volume of each sector, sectors 1, 2, 7, 8 and 5, 11 are identified as high-traffic sectors. This monitoring may be realized by monitoring the traffic volume and location of each connected UE as discussed above with reference to FIG. 3 and thus will not be detailed herein.

Since sectors 1, 2, 7 and 8 are partially overlapping, they may be merged together to generate a high-traffic cell, cell 2, at carrier 2. Likewise, sectors 5 and 11 may also be merged together to generate another high-traffic cell, cell 3, at carrier 2. The high-traffic cell 2 and cell 3 are independent from each other and are assigned with different cell IDs.

UE 1, UE 2 and UE 3 located in the high-traffic cell 2 may be connected to either the common cell 1 or the high-traffic cell 2 but preferably connected to the high-traffic cell 2 if the corresponding UE has a high traffic volume, i.e. its traffic volume is higher than a second predetermined threshold. The second predetermined threshold may be set lower than the first predetermined threshold. UE 6 having a high-traffic volume is preferably connected to the high-traffic cell 3. Other UEs, UE 4, UE 5 and UE 7 have a traffic volume lower than the second predetermined threshold and thus are preferably connected to the common cell 1 to avoid frequent handover when moving within the whole coverage area.

Figure 6:
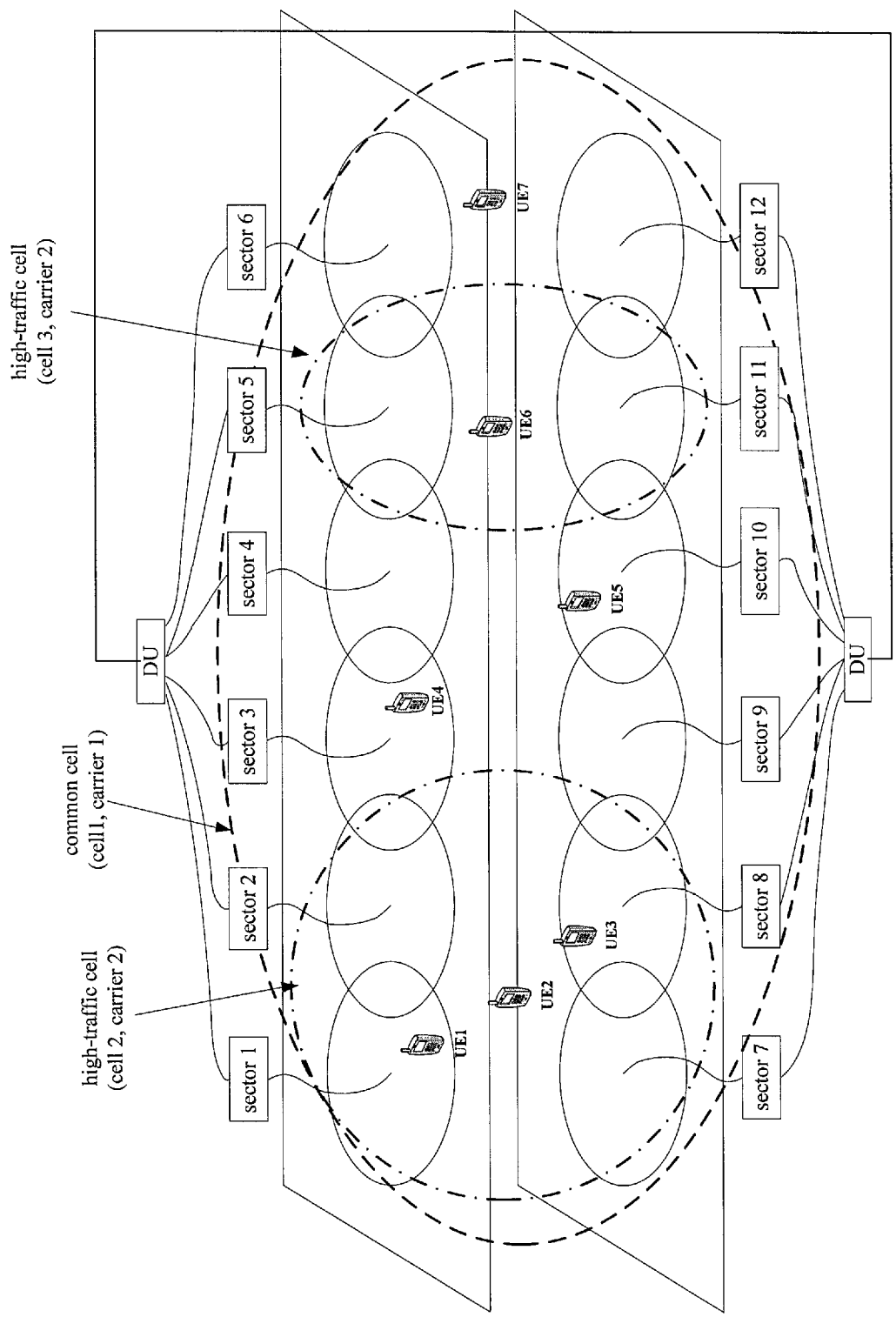
FIG. 6 illustrates another example of the method of FIG. 2 when applied to a distributed antenna network in which sector antennas are deployed in a three-dimensional space.

FIG. 6 illustrates another example of the method 200 when applied to a distributed antenna network in which sector antennas are deployed in a three-dimensional (3D) space. For example, a practical application scenario comprises sector antennas equipped in the ceiling of multiple floors of a building.

In order to simplify the illustration, the antenna located at the center of each sector is omitted. As illustrated in FIG. 6, twelve sectors are deployed in a 3D space and all of them are connected to a common DU of the base station. As mentioned above, all signal processing and protocol processing in both downlink and uplink are collectively executed at the DU, which makes it possible to jointly allocate resources and perform scheduling within the whole coverage area.

In this example, the cell configuration according to the method 200 may be executed similarly as described with reference to FIG. 3 or FIG. 5. Therefore, some details may be omitted from the following description for the sake of brevity.

In this example as illustrated in FIG. 6, at the first carrier, carrier 1, all twelve sectors are combined to generate a common cell, cell 1, which forms global coverage.

By monitoring the traffic volume of each sector, sectors 1, 2, 7, 8 and 5, 11 are identified as high-traffic sectors. This monitoring may be realized by monitoring the traffic volume and location of each connected terminal device as discussed above with reference to FIG. 3 and thus will not be detailed herein.

Since sectors 1, 2, 7 and 8 are partially overlapping (the overlapping parts in the vertical direction is not shown in the figure), they are merged together to generate a high-traffic cell, cell 2, at carrier 2. Likewise, sectors 5 and 11 may also be merged together to generate another high-traffic cell, cell 3, at carrier 2. The high-traffic cell 2 and cell 3 are independent from each other and are assigned with different cell IDs.

UE 1, UE 2 and UE 3 located in the high-traffic cell 2 may be connected to either the common cell 1 or the high-traffic cell 2 but preferably connected to the high-traffic cell 2 if the corresponding UE has a high traffic volume, i.e. its traffic volume is higher than a second predetermined threshold. The second predetermined threshold may be set lower than the first predetermined threshold. UE 6 having a high-traffic volume is preferably connected to the high-traffic cell 3. Other UEs, UE 4, UE 5 and UE 7 have a traffic volume lower than the second predetermined threshold and thus are preferably connected to the common cell 1 to avoid frequent handover when moving within the whole coverage area.

Figure 7:
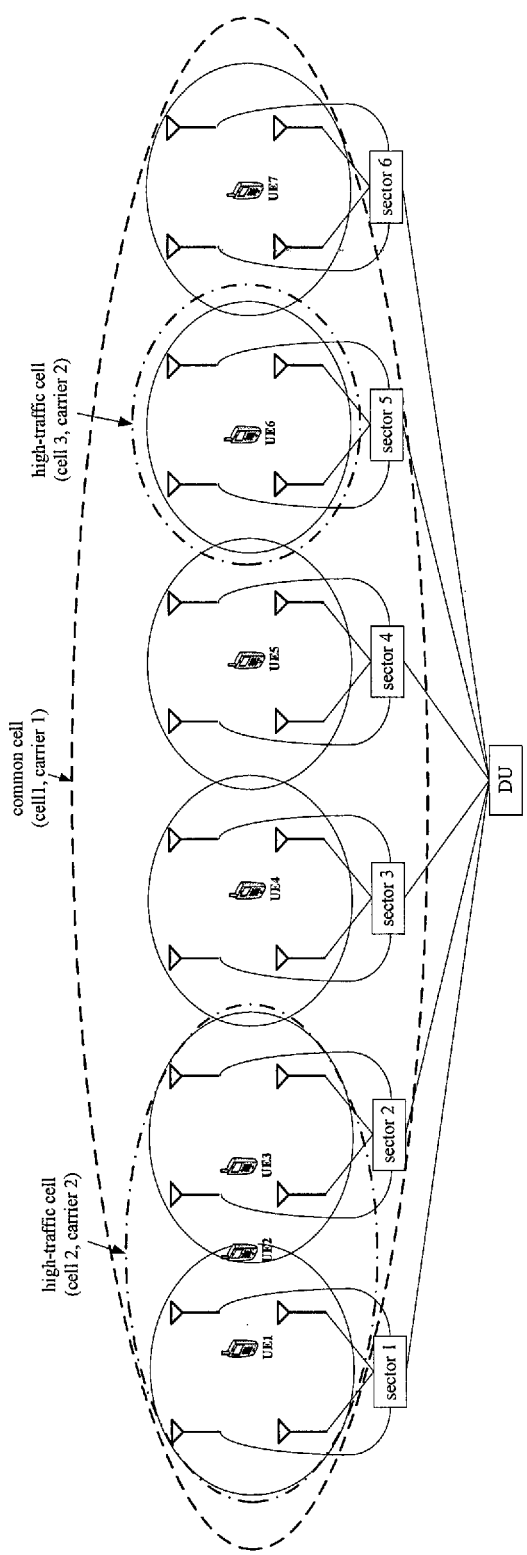
FIG. 7 illustrates another example of the method of FIG. 2 when applied to a distributed antenna network in which sectors are formed in a line.

FIG. 7 illustrates another example of the method 200 when applied to a distributed antenna network in which sectors are formed in a line. The only difference of this example from that of FIG. 3 lies in that each sector in FIG. 7 is radiated by four decentralized antennas instead of a centralized antenna. In this case, each sector of FIG. 7 is the aggregation of the coverage of each distributed antenna. All other operations for the cell configuration are the same as described with reference to FIG. 3 and thus will be omitted herein for the sake of brevity.

Figure 8:
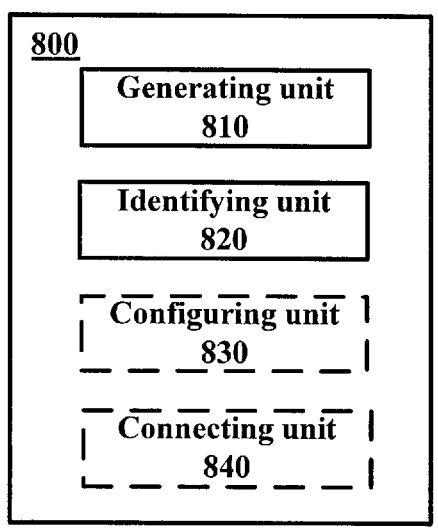
FIG. 8 illustrates a schematic block diagram of an apparatus for cell configuration according to an embodiment of the present disclosure.

FIG. 8 illustrates a schematic block diagram of an apparatus 800 for cell configuration according to an embodiment of the present disclosure. The apparatus 800 may be embodied at or as at least part of a base station of a wireless network with a plurality of carriers. The wireless network is covered at least by a first plurality of sectors at a first carrier of the plurality of carriers and a second plurality of sectors at a second carrier of the plurality of carriers. The first plurality of sectors at least partially overlaps with the second plurality of sectors. The wireless network may be a distributed antenna network as described above with reference to FIGS. 3-7.

Particularly, the apparatus 800 comprises a generating unit 810 and an identifying unit 820. The generating unit 810 is configured to generate a common cell from a first plurality of sectors at a first carrier of the plurality of carriers. The identifying unit 820 is configured to identify one or more high-traffic sectors from a second plurality of sectors at a second carrier of the plurality of carriers by monitoring a traffic volume of each of the second plurality of sectors.

Each of the identified high-traffic sector has the traffic volume higher than a predetermined threshold. The generating unit 810 is further configured to generate one or more independent high-traffic cells from the one or more high-traffic sectors. The first plurality of sectors at least partially overlaps with the second plurality of sectors.

In an embodiment, the generating unit 810 may be further configured to merge two or more high-traffic sectors that are at least partially overlapping into one high-traffic cell.

In another embodiment, the identifying unit 820 may be further configured to adjust the one or more high-traffic sectors according to a change in the monitored traffic volume. In this embodiment, the generating unit 810 may be further configured to generate one or more independent high-traffic cells from the adjusted one or more high-traffic sectors.

In yet another embodiment, the wireless network may support carrier aggregation. In such an embodiment, the apparatus may further comprise a configuring unit 830. The configuring unit 830 may be configured to configure the common cell as a primary cell for a terminal device with the carrier aggregation and to configure the high-traffic cell where the terminal device is located as a secondary cell for the terminal device.

In yet another embodiment, the apparatus may further comprise a connecting unit 840. The connecting unit 840 may be configured to cause a terminal device to be connected to the common cell or to a high-traffic cell of the one or more high-traffic cells based partially on a traffic volume of the terminal device.

In a further embodiment, the connecting unit 840 may be configured to cause the terminal device to be connected to the common cell or to the high-traffic cell based further on a position of the terminal device.

The above units 810-840 may be configured to implement the corresponding operations or steps as described with reference to FIG. 2-7 and thus will not be detailed herein for the sake of brevity.

Figure 9:
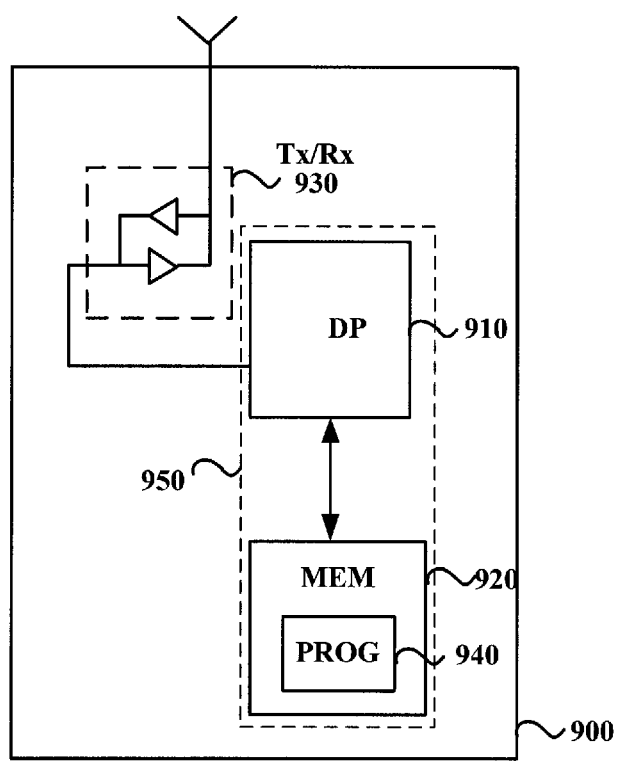
FIG. 9 illustrates a schematic block diagram of another apparatus for cell configuration according to an embodiment of the present disclosure.

FIG. 9 illustrates a schematic block diagram of an apparatus 900 for cell configuration according to an embodiment of the present disclosure. The apparatus 900 may be embodied at or as at least part of a base station of a wireless network with a plurality of carriers. The wireless network is covered at least by a first plurality of sectors at a first carrier of the plurality of carriers and a second plurality of sectors at a second carrier of the plurality of carriers. The first plurality of sectors at least partially overlaps with the second plurality of sectors. The wireless network may be a distributed antenna network as described above with reference to FIGS. 3-7.

The apparatus 900 comprises at least one processor 910, such as a data processor (DP) and at least one memory (MEM) 920 coupled to the processor 910. The apparatus 900 may further comprise a transmitter TX and receiver RX 930 coupled to the processor 910 for establishing wireless communications with other communications devices. The MEM 920 stores a program (PROG) 940. The PROG 940 may include instructions that, when executed on the associated processor 910, enable the apparatus 900 to operate in accordance with the embodiments of the present disclosure, for example to perform the method 200. A combination of the at least one processor 910 and the at least one MEM 920 may form processing means 950 that is adapted to implement some embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 910 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for cell configuration at a base station of a wireless network with a plurality of carriers, the method comprising:
    generating a common cell from a first plurality of sectors at a first carrier of the plurality of carriers;
    identifying, one or more high-traffic sectors from a second plurality of sectors at a second carrier of the plurality of carriers, by monitoring a traffic volume of each of the second plurality of sectors, each of the identified one or more high-traffic sectors having the traffic volume higher than a predetermined threshold; and
    generating one or more independent high-traffic cells from the identified one or more high-traffic sectors,
    wherein at least one sector of the first plurality of sectors has a coverage overlap with at least one sector of the second plurality of sectors.

2. The method according to claim 1, wherein said generating one or more independent high-traffic cells from the identified one or more high-traffic sectors comprises:
merging two or more high-traffic sectors into one high-traffic cell, wherein each of the merged two or more high-traffic sectors has a coverage overlap with at least one other high-traffic sector of the merged two or more high-traffic sectors.

3. The method according to claim 1, wherein:
said identifying one or more high-traffic sectors comprises adjusting the one or more high-traffic sectors according to a change in the monitored traffic volume, and
one or more other independent high-traffic cells are generated from the adjusted one or more high-traffic sectors.

4. The method according to claim 1, wherein the base station supports carrier aggregation, and wherein the method further comprises:
configuring the common cell as a primary cell for a terminal device with the carrier aggregation; and
configuring a high-traffic cell, of the generated one or more independent high-traffic cells, where the terminal device is located as a secondary cell for the terminal device.

5. The method according to claim 1, further comprising:
causing a terminal device to be connected to the common cell or to a high-traffic cell of the generated one or more independent high-traffic cells based partially on a traffic volume of the terminal device.

6. The method according to claim 5, wherein
causing the terminal device to be connected to the common cell or to the high-traffic cell of the generated one or more independent high-traffic cells is further based on a position of the terminal device.

7. The method according to claim 1, wherein
the wireless network is a distributed antenna network.

8. An apparatus for cell configuration in a wireless network with a plurality of carriers, comprising one or more processors and a memory, the one or more processors configured to:
generate a common cell from a first plurality of sectors at a first carrier of the plurality of carriers;
identify, one or more high-traffic sectors from a second plurality of sectors at a second carrier of the plurality of carriers by monitoring a traffic volume of each of the second plurality of sectors, each of the identified one or more high-traffic sectors having the traffic volume higher than a predetermined threshold; and
generate one or more independent high-traffic cells from the identified one or more high-traffic sectors,
wherein at least one sector of the first plurality of sectors has a coverage overlap with at least one sector of the second plurality of sectors.

9. The apparatus according to claim 8, wherein the one or more processors are further configured to:
merge two or more high-traffic sectors into one high-traffic cell, wherein each of the merged two or more high-traffic sectors has a coverage overlap with at least one other high-traffic sector of the merged two or more high-traffic sectors.

10. The apparatus according to claim 8, wherein:
the one or more processors are further configured to adjust the one or more high-traffic sectors according to a change in the monitored traffic volume, and
the one or more processors are further configured to generate one or more other independent high-traffic cells from the adjusted one or more high-traffic sectors.

11. The apparatus according to claim 8, wherein the wireless network supports carrier aggregation, and wherein the one or more processors are further configured to:
configure the common cell as a primary cell for a terminal device with the carrier aggregation; and
configure a high-traffic cell, of the generated one or more independent high-traffic cells, where the terminal device is located as a secondary cell for the terminal device.

12. The apparatus according to claim 8, wherein the one or more processors are further configured to:
cause a terminal device to be connected to the common cell or to a high-traffic cell of the generated one or more independent high-traffic cells based partially on a traffic volume of the terminal device.

13. The apparatus according to claim 12, wherein
the one or more processors are configured to cause the terminal device to be connected to the common cell or to the high-traffic cell of the generated one or more independent high-traffic cells based further on a position of the terminal device.

14. The apparatus according to claim 8, wherein
the wireless network is a distributed antenna network.

15. An apparatus for cell configuration in a wireless network with a plurality of carriers, the apparatus comprising a processor and a memory, said memory containing instructions executable by said processor, whereby said apparatus is operative to perform the method of claim 1.

16. An apparatus for cell configuration in a wireless network with a plurality of carriers, the apparatus comprising processing means adapted to perform the method of claim 1.

17. A computer program, comprising instructions which, when executed on at least one processor, cause the at least one processor to carry out the method according to claim 1.

* * * * *